United States Patent
Zhan et al.

(10) Patent No.: US 12,126,531 B2
(45) Date of Patent: Oct. 22, 2024

(54) ROUTE PROCESSING METHOD AND NETWORK DEVICE

(71) Applicant: Huawei Technologies Co., Ltd., Shenzhen (CN)

(72) Inventors: Lanlan Zhan, Nanjing (CN); Weibo Wang, Beijing (CN); Qiao Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 479 days.

(21) Appl. No.: 17/487,183

(22) Filed: Sep. 28, 2021

(65) Prior Publication Data

US 2022/0103475 A1 Mar. 31, 2022

(30) Foreign Application Priority Data

Sep. 30, 2020 (CN) ............ 202011066509.8

(51) Int. Cl.
*H04L 45/74* (2022.01)
*H04L 12/46* (2006.01)

(52) U.S. Cl.
CPC ......... *H04L 45/74* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 2017/0118043 | A1 | 4/2017 | Hao et al. |
| 2017/0279710 | A1 | 9/2017 | Khan et al. |
| 2017/0310589 | A1 | 10/2017 | Tambakuwala et al. |
| 2020/0127913 | A1* | 4/2020 | Filsfils .............. H04L 45/04 |
| 2021/0119917 | A1 | 4/2021 | Yu |
| 2021/0328906 | A1 | 10/2021 | Peng et al. |
| 2021/0385163 | A1 | 12/2021 | Gao et al. |

FOREIGN PATENT DOCUMENTS

| | | |
|---|---|---|
| CN | 110266592 A | 9/2019 |
| CN | 110661711 A | 1/2020 |
| CN | 110830352 A | 2/2020 |
| CN | 111355661 A | 6/2020 |
| CN | 111628921 A | 9/2020 |
| WO | 2020029976 A1 | 2/2020 |

OTHER PUBLICATIONS

Agrawal, S., et al., "SRv6 and MPLS interworking," draft-agrawal-spring-srv6-mplsinterworking-01.txt, Jul. 8, 2019, 9 pages.
Zhang, et al, "SRv6 and MPLS interworking for VPN service," draft-pzm-bess-spring-interdomain-vpn-01, Jan. 3, 2020, 5 pages.

* cited by examiner

*Primary Examiner* — Christine T Duong
(74) *Attorney, Agent, or Firm* — Conley Rose, P.C.

(57) ABSTRACT

A route processing method, implemented by a first device, includes: receiving a first route sent by a second network device, where the first route includes a first identifier; allocating, based on the first identifier, a second identifier corresponding to the first route; and sending a second route to a third network device based on the first route, where the second route includes the second identifier. The second network device is located in a first network domain, and the third network device is located in a second network domain.

20 Claims, 8 Drawing Sheets

ROUTE PROCESSING METHOD AND NETWORK DEVICE

CROSS-REFERENCE TO RELATED APPLICATIONS

This claims priority to Chinese Patent App. No. 202011066509.8, filed on Sep. 30, 2020, which is incorporated by reference.

FIELD

This disclosure relates to the field of communications technologies, and in particular, to a route processing method and a network device.

BACKGROUND

With the development of Segment Routing over Internet Protocol version 6 (SRv6) technologies, more newly constructed networks use the SRv6 technologies. Therefore, a scenario in which a newly constructed SRv6 network and a conventional multi-protocol label switching (MPLS) network are stitched occurs.

There are a large quantity of cross-network services at a stitching node at which a newly constructed network and a conventional network are stitched. Currently, when learning of a route advertised in a network, the stitching node needs to transfer the route to a virtual routing and forwarding (VRF) instance of a private network (that is, obtain the route through screening and replicate the route to the VRF instance), and then re-advertise the route to another network based on the VRF instance. In this route processing manner, the stitching node needs to be capable of perceiving the VRF. Therefore, a large amount of configuration needs to be added on the stitching node. As a result, stitching node configuration is cumbersome.

SUMMARY

This disclosure provides a route processing method. When receiving a first route sent by a second network device in a first network domain, a first network device allocates a corresponding second identifier to the first route based on a first identifier in the first route, and sends a second route that carries the second identifier to a third network device in a second network domain. Both the first identifier and the second identifier are used to guide packet forwarding between network devices. Allocating the second identifier in the second network domain based on the first identifier in the first network domain and using the second route to carry the second identifier can implement normal route advertisement in a cross-network domain scenario, and avoid adding a large amount of configuration on a stitching node, so that configuration pressure is reduced. In addition, a forwarding path of the first network device can be controlled based on a one-to-one correspondence between identifiers, so that normal packet processing is ensured.

A first aspect provides a route processing method, including: A first network device receives a first route sent by a second network device located in a first network domain, where the first route includes a first identifier; the first network device allocates, based on the first identifier, a second identifier corresponding to the first route; and the first network device sends, based on the first route, a second route including the second identifier to a third network device located in a second network domain. Different forwarding types are used for packet forwarding in the first network domain and the second network domain, the second identifier is used to instruct the third network device to forward a first packet to the first network device, and the first identifier is used to instruct the first network device to forward the first packet to the second network device. For example, that different forwarding types are used for packet forwarding in the first network domain and the second network domain may be specifically that different types of tunneling technologies are used to implement packet forwarding in the first network domain and the second network domain.

The second identifier in the second network domain is allocated based on the first identifier in the first network domain, and the second route carries the second identifier. This can implement normal route advertisement in a cross-network domain scenario, and avoid adding a large amount of configuration on a stitching node, so that configuration pressure is reduced.

Optionally, in a possible implementation, the first route further includes an address of the second network device, and that the first network device allocates the corresponding second identifier to the first route based on the first identifier includes: The first network device allocates the corresponding second identifier to the first route based on the address of the second network device and the first identifier. In other words, for the first network device, if network device addresses are the same and first identifiers are the same, the first network device allocates the corresponding second identifier.

An identifier in the second network domain is allocated based on an address of a network device sending a route in the first network domain and an identifier in the route, so that when routes sent by a plurality of network devices in the first network domain carry a same identifier, a plurality of identifiers in the second network domain may be allocated. In this way, a one-to-one correspondence between the identifiers in the second network domain and forwarding paths in the first network domain is formed, and normal packet processing is ensured.

Optionally, in a possible implementation, the first identifier is used to identify a service source corresponding to the first route. For example, the service source may be a virtual private network (VPN) instance connected to the second network device, an outbound interface on the second network device, or a virtual machine (VM) connected to the second network device.

Optionally, in a possible implementation, the method further includes: The first network device receives a third route sent by the second network device, where the third route includes the address of the second network device and a third identifier, and the third identifier and the first identifier are used to identify different service sources; the first network device allocates, based on the address of the second network device and the third identifier, a fourth identifier corresponding to the third route; and the first network device sends a fourth route to the third network device based on the third route, where the fourth route includes the fourth identifier, and the fourth identifier is used to instruct the third network device to forward a third packet to the first network device.

The first network device may be connected to a plurality of network devices in the first network domain, and allocate, based on different received routes, a plurality of identifiers of the routes in the second network domain, so that a one-to-one correspondence between the plurality of identifiers in the second network domain and a plurality of forwarding paths in the first network domain is formed, and it is ensured that a packet can be flexibly forwarded across network domains.

Optionally, in a possible implementation, the method further includes: The first network device receives a fifth route sent by a fourth network device, where the fifth route includes an address of the fourth network device and the first identifier, a prefix address of the fifth route is the same as a prefix address of the first route, the fourth network device is located in the first network domain, and the fourth network device and the second network device are connected to, for example, a same VM or VPN instance; the first network device allocates a corresponding fifth identifier to the fifth route based on the address of the fourth network device and the first identifier, where the address of the fourth network device may be, for example, carried in a next hop field of the fifth route; and the first network device sends a sixth route to the third network device based on the fifth route, where the sixth route includes the fifth identifier, and the fifth identifier is used to instruct the third network device to forward a second packet to the first network device.

An identifier in the second network domain is allocated based on an address of a network device sending a route in the first network domain and an identifier in the route, so that when routes sent by a plurality of network devices in the first network domain carry a same identifier, a plurality of different corresponding identifiers in the second network domain may be allocated based on the plurality of different network devices sending the routes in the first network domain. In this way, a one-to-one correspondence between the identifiers in the second network domain and forwarding paths in the first network domain is formed, normal packet processing is ensured, and load balancing in some service scenarios is ensured.

Optionally, in a possible implementation, the method further includes: The first network device establishes a correspondence between the first identifier and the second identifier; the first network device receives the first packet sent by the third network device, where the first packet includes the second identifier; the first network device updates the first packet based on the second identifier and the correspondence, to obtain a second packet, where the second packet includes the first identifier; and the first network device sends the second packet to the second network device.

The first network device pre-establishes a correspondence between an identifier in a route received from the first network domain and an identifier allocated by the first network device to the second network domain, so that when receiving a packet including the identifier allocated to the second network domain, the first network device can determine the identifier in the first network domain based on the identifier in the packet, so that normal packet forwarding is implemented.

Optionally, in a possible implementation, the correspondence established by the first network device includes a correspondence among an address of the second network device, the first identifier, and the second identifier, and that the first network device sends the second packet to the second network device includes: The first network device determines the address of the second network device based on the first identifier and the correspondence, and sends the second packet to the second network device based on the address of the second network device.

Optionally, in a possible implementation, an MPLS tunnel is used for packet transmission in the first network domain, and an SRv6 tunnel is used for packet transmission in the second network domain; or an SRv6 tunnel is used for packet transmission in the first network domain, and an MPLS tunnel is used for packet transmission in the second network domain.

Optionally, in a possible implementation, the first identifier is a segment identifier (SID), and the second identifier is an MPLS label; or the first identifier is an MPLS label, and the second identifier is a SID.

Optionally, in a possible implementation, the first network device includes a gateway device of a data center or an aggregation device of an Internet Protocol (IP) radio access network (RAN).

Optionally, in a possible implementation, the second network device includes a provider edge (PE) device.

A second aspect provides a first network device, including a transceiver unit and a processing unit. The transceiver unit is configured to receive a first route sent by a second network device, where the first route includes a first identifier. The processing unit is configured to allocate, based on the first identifier, a second identifier corresponding to the first route. The transceiver unit is configured to send a second route to a third network device based on the first route, where the second route includes the second identifier. The second network device is located in a first network domain, the third network device is located in a second network domain, different forwarding types are used for packet forwarding in the first network domain and the second network domain, the second identifier is used to instruct the third network device to forward a first packet to the first network device, and the first identifier is used to instruct the first network device to forward the first packet to the second network device.

Optionally, in a possible implementation, the first route further includes an address of the second network device, and the processing unit is further configured to allocate the corresponding second identifier to the first route based on the address of the second network device and the first identifier.

Optionally, in a possible implementation, the first identifier is used to identify a service source corresponding to the first route.

Optionally, in a possible implementation, the service source includes a VPN instance connected to the second network device, an outbound interface on the second network device, or a VM connected to the second network device.

Optionally, in a possible implementation, the transceiver unit is further configured to receive a third route sent by the second network device, where the third route includes the address of the second network device and a third identifier, and the third identifier and the first identifier are used to identify different service sources; the processing unit is further configured to allocate, based on the address of the second network device and the third identifier, a fourth identifier corresponding to the third route; and the transceiver unit is further configured to send a fourth route to the third network device based on the third route, where the fourth route includes the fourth identifier, and the fourth identifier is used to instruct the third network device to forward a third packet to the first network device.

Optionally, in a possible implementation, the transceiver unit is further configured to receive a fifth route sent by a fourth network device, where the fifth route includes an address of the fourth network device and the first identifier, a prefix address of the fifth route is the same as a prefix address of the first route, and the fourth network device is located in the first network domain; the processing unit is further configured to allocate a corresponding fifth identifier to the fifth route based on the address of the fourth network device and the first identifier; and the transceiver unit is further configured to send a sixth route to the third network device based on the third route, where the sixth route includes the fifth identifier, and the fifth identifier is used to instruct the third network device to forward a second packet to the first network device.

Optionally, in a possible implementation, the processing unit is further configured to establish a correspondence between the first identifier and the second identifier; the transceiver unit is further configured to receive the first packet sent by the third network device, where the first packet includes the second identifier; the processing unit is further configured to update the first packet based on the second identifier and the correspondence, to obtain a second packet, where the second packet includes the first identifier; and the transceiver unit is further configured to send the second packet to the second network device.

Optionally, in a possible implementation, the correspondence established by the first network device includes a correspondence among an address of the second network device, the first identifier, and the second identifier, and the processing unit is further configured to: determine the address of the second network device based on the first identifier and the correspondence, and control, based on the address of the second network device, the transceiver unit to send the second packet to the second network device.

Optionally, in a possible implementation, an MPLS tunnel is used for packet transmission in the first network domain, and an SRv6 tunnel is used for packet transmission in the second network domain; or an SRv6 tunnel is used for packet transmission in the first network domain, and an MPLS tunnel is used for packet transmission in the second network domain.

Optionally, in a possible implementation, the first identifier is a SID, and the second identifier is an MPLS label; or the first identifier is an MPLS label, and the second identifier is a SID.

Optionally, in a possible implementation, the first network device includes a gateway device of a data center or an aggregation device of an IP RAN.

Optionally, in a possible implementation, the second network device includes a PE device.

A third aspect provides a network device. The network device includes a processor configured to enable the network device to implement the method described in any possible implementation of the first aspect. The device may further include a memory. The memory is coupled to the processor. When the processor executes instructions stored in the memory, the network device can implement the method described in any possible implementation of the first aspect. The device may further include a communications interface. The communications interface is used by the device to communicate with another device. For example, the communications interface may be a transceiver, a circuit, a bus, a module, or a communications interface of another type.

The instructions in the memory may be pre-stored, or may be downloaded from the internet and then stored when the network device is used. Sources of the instructions in the memory are not specifically limited. The coupling is an indirect coupling or a connection between apparatuses, units, or modules, may be in an electrical form, a mechanical form, or another form, and is used for information exchange between the apparatuses, the units, or the modules.

A fourth aspect provides a computer storage medium. The computer storage medium may be non-volatile. The computer storage medium stores computer-readable instructions, and when the computer-readable instructions are executed by a processor, the method described in any possible implementation of the first aspect is implemented.

A fifth aspect provides a computer program product including instructions. When the computer program product runs on a computer, the computer is enabled to perform the method described in any possible implementation of the first aspect.

A sixth aspect provides a network system. The network system includes the network device in any implementation of the second aspect or the third aspect, and the second network device and the third network device in any implementation of the first aspect.

Optionally, in a possible implementation, the network system may include a plurality of network devices in any implementation of the second aspect or the third aspect.

The solutions provided in the second aspect to the sixth aspect are used to implement or cooperate to implement the method provided in the first aspect, and therefore, can achieve beneficial effects the same as or corresponding to those in the first aspect. Details are not described herein again.

DETAILED DESCRIPTION

Figure 1:
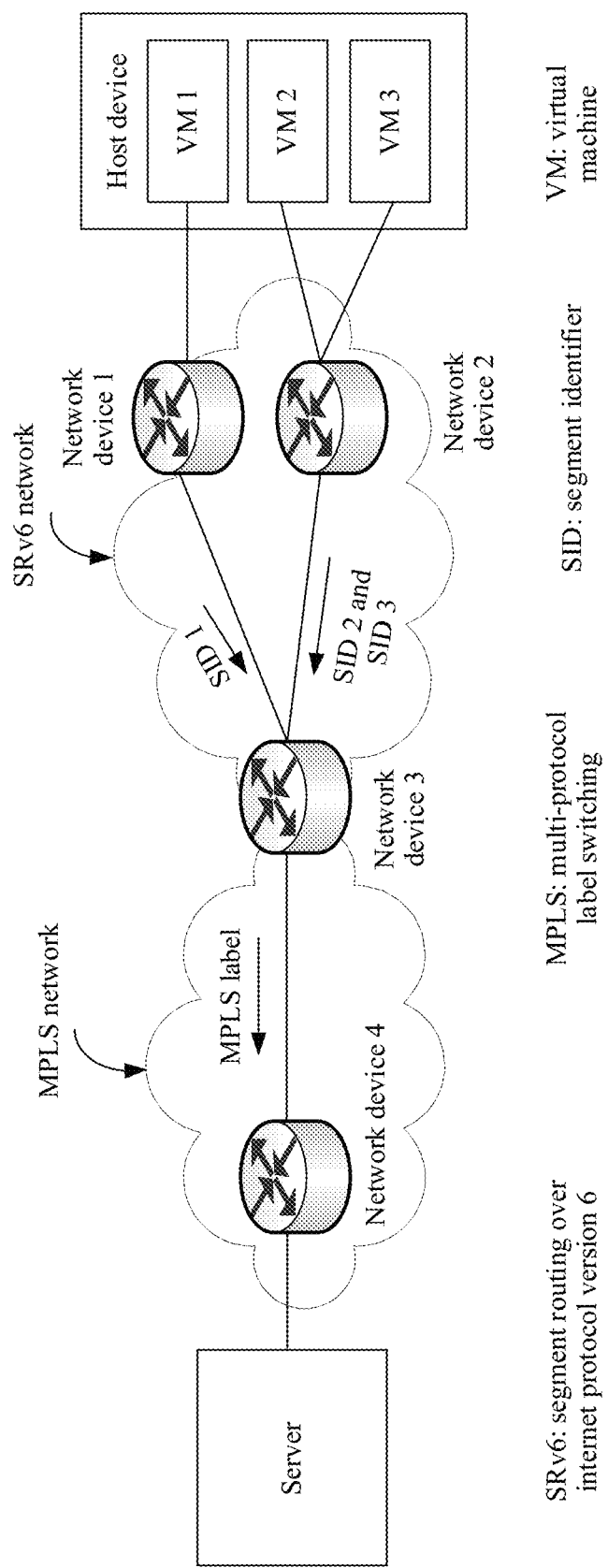
FIG. 1 is a schematic diagram of allocating an MPLS label based on a prefix address in a related technology according to an embodiment.

To make objectives, technical solutions, and advantages clearer, the following describes embodiments with reference to accompanying drawings. It is clear that, the described embodiments are merely some but not all of the embodiments. A person of ordinary skill in the art may learn that the technical solutions provided in the embodiments are also applicable to a similar technical problem.

In the specification, claims, and accompanying drawings, terms such as "first" and "second" are intended to distinguish between similar objects, but do not necessarily indicate a specific order or sequence. It should be understood that data used in such a way is interchangeable in proper circumstances, so that the embodiments described herein can be implemented in other orders than the order illustrated or described herein. In addition, terms "include" and "have" and any variants thereof are intended to cover the non-exclusive inclusion. For example, a process, method, system, product, or device that includes a list of steps or modules is not necessarily limited to those expressly listed steps or modules, but may include other steps or modules not expressly listed or inherent to such a process, method, product, or device. Naming or numbering of steps does not mean that the steps in method procedures need to be performed in a time/logical order indicated by the naming or numbering. An execution order of the steps in the procedures that have been named or numbered can be changed based on a technical objective to be achieved, as long as same or similar technical effects can be achieved. Division into units is logical division and may be other division in an actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in this disclosure. In addition, units or subunits described as separate parts may or may not be physically separate, may or may not be physical units, or may be distributed into a plurality of circuit units. Some or all of the units may be selected based on actual requirements to achieve the objectives of the solutions.

With the development of SRv6 technologies, more newly constructed networks use the SRv6 technologies. Therefore, a scenario in which a newly constructed SRv6 network and a conventional MPLS network are stitched occurs. For example, when a network in an area is newly deployed, if the newly deployed network in the area is an SRv6 network, and the SRv6 network in the area needs to be connected to an MPLS network in another area, a scenario in which the newly constructed SRv6 network and the conventional MPLS network are stitched occurs. For another example, in a case of local network reconstruction, if a local network in an area is reconstructed from a conventional MPLS network to an SRv6 network, the reconstructed SRv6 network is still connected to an unreconstructed MPLS network in the area, and a scenario in which the SRv6 network and the MPLS network are stitched also occurs.

There are a large quantity of cross-network services at a stitching node at which a newly constructed network and a conventional network are stitched, that is, a node connected to two types of networks at the same time. Currently, when learning of a route advertised in a network, the stitching node needs to transfer the route to a VRF instance of a private network (that is, obtain the route through screening and replicate the route to the VRF instance), and then re-advertise the route to another network based on the VRF instance. In this route processing manner, the stitching node needs to be capable of perceiving the VRF. Therefore, a large amount of configuration needs to be added on the stitching node. As a result, stitching node configuration is cumbersome.

For example, FIG. 1 is a schematic diagram of allocating an MPLS label based on a prefix address in a related technology according to an embodiment. As shown in FIG. 1, a network device 1 and a network device 2 are located in a newly constructed SRv6 network, a network device 4 is located in a conventional MPLS network, and a network device 3 is located in a stitching area between the newly constructed SRv6 network and the conventional MPLS network. The network device 1 is connected to a VM 1 in a host device, and the network device 1 may allocate a corresponding SID 1 to the VM 1, and advertise, to the network device 3, a route 1 that carries the SID 1. The network device 2 is connected to a VM 2 and a VM 3 in the host device, and the network device 2 may allocate a corresponding SID 2 and a corresponding SID 3 to the VM 2 and the VM 3, and advertise, to the network device 3, a route 2 that carries the SID 2 and a route 3 that carries the SID 3. The VM 1, the VM 2, and the VM 3 in the host device are configured to carry a same service, and may be configured to implement load balancing of the service.

In a related technology, when the network device 3 receives the routes advertised by the network device 1 and the network device 2, the network device 3 needs to transfer, to a VRF instance, the routes advertised by the network device 1 and the network device 2, and then re-advertise the routes to the network device 4 based on the VRF instance. Because the network device 3 needs to perceive the VRF instance, a large amount of configuration needs to be added on the network device 3. As a result, configuration of the network device 3 is cumbersome, and configuration pressure of operation and maintenance personnel is increased.

In addition, when the network device 3 allocates an MPLS label based on a prefix address, because prefix addresses of the route 1, the route 2, and the route 3 are the same (all the prefix addresses are an address of the host device), the network device 3 allocates one MPLS label to the three routes, and uses the routes to carry the MPLS label, to send the MPLS label to the network device 4. In this case, when the network device 4 receives a packet destined for the host device, the network device 4 determines that there is only one MPLS label corresponding to the packet, and forwards the packet to the network device 3 by using the MPLS label. For the network device 3, the MPLS label corresponds to three SIDs, that is, the MPLS label corresponds to a path to the network device 1 and a path to the network device 2. Therefore, the network device 3 may select one path from the path to the network device 1 and the path to the network device 2 to send the packet. In this case, actually, the network device 3 may randomly select one path or fixedly select a specific path from the two paths to forward the packet. To be specific, a ratio of packets destined for the network device 1 to packets destined for the network device 2 is 1:1. However, actually, the network device 1 is connected to one VM, and the network device 2 is connected to two VMs. Therefore, a ratio of packets received by the VM 1 to packets received by the VM 2 to packets received by the VM 3 is 2:1:1. This causes a load imbalance between the VMs. Consequently, normal packet processing is affected, and service execution or provisioning efficiency is affected.

In view of this, an embodiment provides a route processing method. When receiving a first route sent by a second network device in a first network domain, a first network device allocates a corresponding second identifier to the first route based on a first identifier in the first route, and sends a second route that carries the second identifier to a third network device in a second network domain. Both the first identifier and the second identifier are used to guide packet forwarding between network devices. Allocating the second identifier in the second network domain based on the first identifier in the first network domain and using the second route to carry the second identifier can implement normal route advertisement in a cross-network domain scenario, and avoid adding a large amount of configuration on a stitching node, so that configuration pressure is reduced. In addition, a forwarding path of the first network device can be controlled based on a one-to-one correspondence between identifiers, so that normal packet processing is ensured, and service running is better guaranteed.

Figure 2:
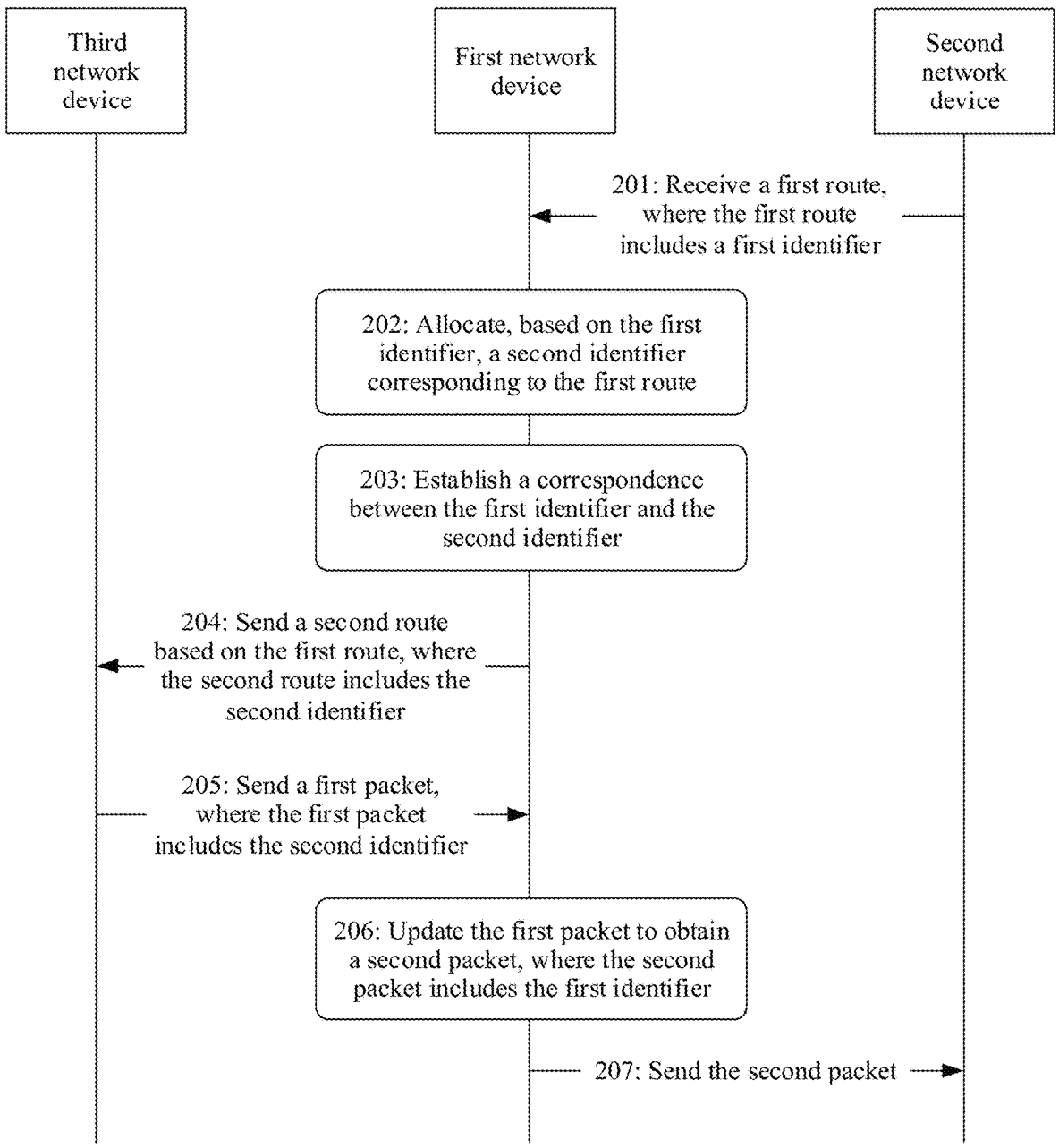
FIG. 2 is a schematic flowchart of a route processing method 200 according to an embodiment.

FIG. 2 is a schematic flowchart of a route processing method 200 according to an embodiment. As shown in FIG. 2, the route processing method 200 may be applied to the network architecture shown in FIG. 1. The route processing method 200 includes the following steps.

Step 201: A first network device receives a first route sent by a second network device, where the first route includes a first identifier.

In this embodiment, the first network device may be an edge device at an intersection of a first network domain and a second network domain, and is configured to implement normal execution of a cross-domain service. The first network device may be connected to the second network device in the first network domain, and may be connected to a third network device in the second network domain. For example, the first network device may be a gateway device of a data center or an aggregation device of an IP RAN. The second network device and the third network device may be, for example, PE devices.

Different forwarding types may be used for packet forwarding in the first network domain and the second network domain. The first network device and the second network device may be tunnel endpoint devices in the first network domain, and the first network device and the third network device may be tunnel endpoint devices in the second network domain. For example, the first network domain may be an SRv6 network, and a forwarding type used in the first network domain is forwarding a packet based on an SRv6 tunnel. The second network domain may be an MPLS network, and a forwarding type used in the second network domain is forwarding a packet based on an MPLS tunnel. Alternatively, a forwarding type that is forwarding a packet based on an MPLS tunnel is used in the first network domain, and a forwarding type that is forwarding a packet based on an SRv6 tunnel is used in the second network domain. Other than the foregoing forwarding types that are forwarding a packet based on an SRv6 tunnel and forwarding a packet based on an MPLS tunnel, other possible forwarding types may alternatively be used for packet forwarding in the first network domain and the second network domain, and the forwarding types used in the first network domain and the second network domain are different.

In a route advertisement process, the first route sent by the second network device includes the first identifier, and the first identifier is used to instruct the first network device to forward a first packet to the second network device in a packet forwarding process. For example, the first identifier may be used to identify a service source corresponding to the first route, and the service source may include, for example, a VPN instance connected to the second network device, an outbound interface on the second network device, or a VM connected to the second network device.

Briefly, the first identifier may be an identifier allocated by the second network device to the VPN instance connected to the second network device. Alternatively, the first identifier may be an identifier allocated by the second network device to the outbound interface on the second network device, and a corresponding physical or virtual device, such as a VPN instance or a VM, that can be configured to process a service is connected to the outbound interface. Alternatively, the first identifier may be an identifier allocated by the second network device to the VM connected to the second network device, and the VM is configured to process a service.

In a possible embodiment, when the first network domain in which the second network device is located is an SRv6 network, the first identifier may be, for example, a SID. When the first network domain in which the second network device is located is an MPLS network, the first identifier may be, for example, an MPLS label.

Step 202: The first network device allocates, based on the first identifier, a second identifier corresponding to the first route.

In this embodiment, the first identifier is an identifier corresponding to the first route in the first network domain, and the first network device may allocate the second identifier corresponding to the first route in the second network domain to the first route based on the first identifier. The second identifier is used to instruct the third network device in the second network domain to forward a packet to the first network device.

In a possible embodiment, when the second network domain in which the third network device is located is an MPLS network, the second identifier may be, for example, an MPLS label. When the second network domain in which the third network device is located is an SRv6 network, the second identifier may be, for example, a SID.

Step 203: The first network device establishes a correspondence between the first identifier and the second identifier.

After the first network device allocates the second identifier to the first route that carries the first identifier, the first network device may establish the correspondence between the first identifier and the second identifier, and store the correspondence, so that the first identifier can be determined based on the second identifier in a subsequent packet forwarding process.

In a possible embodiment, the first route received by the first network device may further include an address of the second network device. For example, the address of the second network device may be carried in a next hop field of the first route, and the first network device may obtain the address of the second network device based on the next hop field of the first route.

When the first network device can obtain the address of the second network device, the first network device may alternatively allocate the corresponding second identifier to the first route based on the address of the second network device and the first identifier.

In this case, the correspondence established by the first network device may be a correspondence among the address of the second network device, the first identifier, and the second identifier. In other words, the first network device may determine, based on the second identifier, the address of the second network device and the first identifier that correspond to the second identifier.

Step 204: The first network device sends a second route to the third network device based on the first route, where the second route includes the second identifier.

After the first network device allocates the second identifier, the first network device may obtain the second route based on the first route in a manner such as update or regeneration. The second route includes the second identifier. Then, the first network device sends the second route to the third network device located in the second network domain, so that the third network device can forward a corresponding packet to the first network device based on the second identifier in the second route. In this way, the first network device further forwards the packet to the second network device in another network domain.

Step 205: The first network device receives a first packet sent by the third network device, where the first packet includes the second identifier.

In a packet forwarding process, the first network device may receive the first packet that is sent by the third network device and that includes the second identifier.

Step 206: The first network device updates the first packet based on the second identifier and the correspondence, to obtain a second packet, where the second packet includes the first identifier.

In this embodiment, after receiving the first packet, the first network device may determine the second identifier included in the first packet, and determine, based on the foregoing correspondence, the first identifier corresponding to the second identifier. Based on the first identifier determined by using the second identifier, the first network device may update the first packet. Specifically, the first network device may remove the second identifier in the first packet, and add the first identifier to the first packet, to obtain the second packet including the first identifier.

Step 207: The first network device sends the second packet to the second network device.

In this embodiment, when the correspondence established by the first network device includes the first identifier, the second identifier, and the address of the second network device, the first network device may determine the address of the second network device based on the first identifier and the correspondence, and send the second packet to the second network device based on the address of the second network device.

When the correspondence established by the first network device includes only the first identifier and the second identifier, the first network device may determine, based on a preset mapping relationship between the first identifier and the address of the second network device, the address that is of the second network device and that corresponds to the first identifier, and send the second packet to the second network device.

For example, when the second network device allocates the first identifier to the service source, the second network device may allocate the first identifier based on a pre-allocated address segment, so as to ensure that the first identifier is within the allocatable address segment corresponding to the second network device. In the first network device, a mapping relationship between the address of the second network device and the allocatable address segment corresponding to the second network device may be preset. In this way, after the first network device obtains the first identifier, the first network device may determine that the first identifier is within the allocatable address segment corresponding to the second network device, and determine the address of the second network device based on the mapping relationship and the allocatable address segment. In other words, the address of the second network device is determined based on the first identifier.

When the second network device allocates the first identifier based on the pre-allocated address segment, address segments allocated to the second network device and another network device may be different. In this way, when each network device allocates an identifier to a service source, it can be ensured that each network device allocates a different identifier, so that it can be ensured that the first network device can uniquely determine the address of the second network device based on the first identifier.

In a possible embodiment, in the embodiment corresponding to FIG. 2, the second network device may further allocate a plurality of identifiers corresponding to different service sources, and send corresponding routes to the first network device.

For example, the route processing method 200 may further include: The first network device receives a third route sent by the second network device, where the third route includes the address of the second network device and a third identifier, and the third identifier and the first identifier are used to identify different service sources. For example, when the second network device is connected to a plurality of VMs, the second network device may separately allocate the first identifier and the third identifier to different VMs. The first network device allocates, based on the address of the second network device and the third identifier, a fourth identifier corresponding to the third route. The fourth identifier is an identifier corresponding to the third route in the second network domain. The first network device sends a fourth route to the third network device based on the third route, where the fourth route includes the fourth identifier, and the fourth identifier is used to instruct the third network device to forward a third packet to the first network device.

To be specific, when the second network device is connected to a plurality of VMs located in a same host device, the first network device may allocate a plurality of corresponding identifiers in the second network domain based on a plurality of routes that are sent by the second network device and that carry different identifiers, to form a one-to-one correspondence between the plurality of identifiers in the second network domain and a plurality of forwarding paths in the first network domain, so that the third network device can obtain a plurality of forwarding paths of packets with a same destination address. This ensures that the packets can be flexibly forwarded across network domains.

Figure 3:
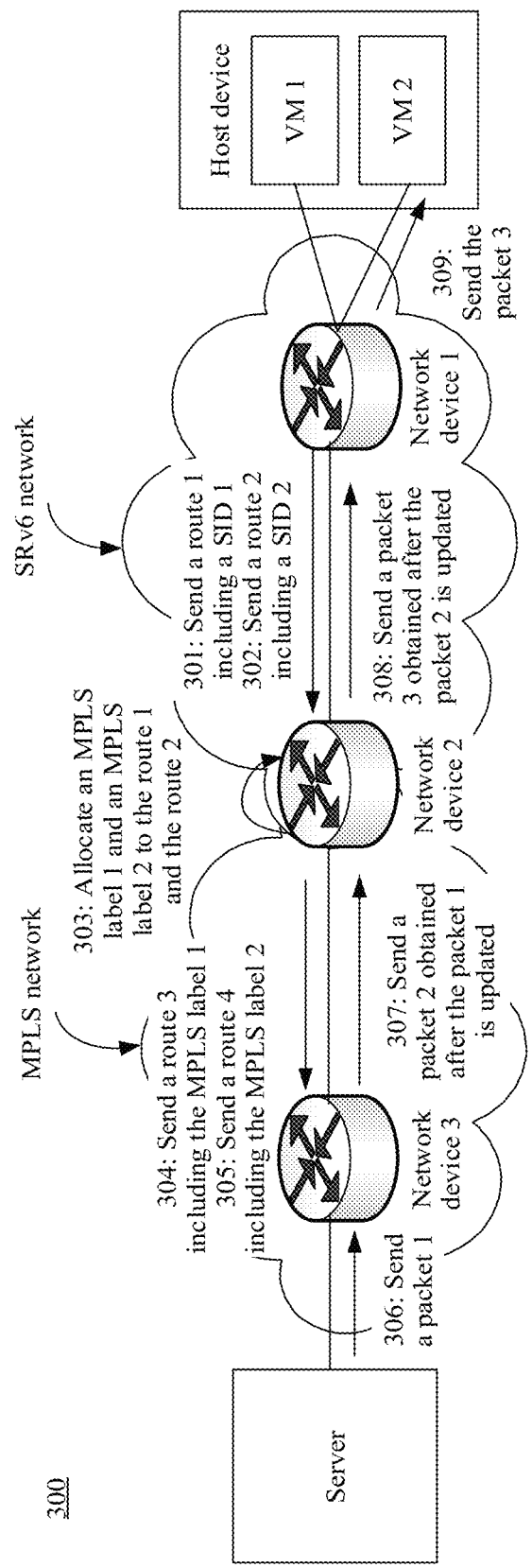
FIG. 3 is a schematic diagram of a route processing method 300 according to an embodiment.

For ease of understanding, the route processing method provided in the embodiments is described below in detail with reference to a specific example. FIG. 3 is a schematic diagram of a route processing method 300 according to an embodiment. As shown in FIG. 3, a network device 1 is located in an SRv6 network, a network device 3 is located in an MPLS network, and a network device 2 is located in a stitching area between the SRv6 network and the MPLS network. In addition, the network device 1 is connected to a VM 1 and a VM 2 in a host device. The route processing method 300 includes the following steps.

Step 301: The network device 1 sends a route 1 to the network device 2, where the route 1 includes a SID 1.

In this embodiment, after the VM 1 connected to the network device 1 goes online, the network device 1 may allocate the corresponding SID 1 to the VM 1 connected to the network device 1, or the network device 1 may allocate the corresponding SID 1 to an outbound interface that is of the network device 1 and that is connected to the VM 1.

After the SID 1 is allocated, when the host device sends a route to the network device 1 by using the VM 1, a route prefix of the route is an address of the host device, and the network device 1 may generate the route 1 based on the route sent by the host device. A route prefix of the route 1 is the address of the host device. The route 1 further includes the SID 1 and an address of the network device 1. For example, the SID 1 may be located in a Prefix-SID field of the route 1, and the address of the network device 1 may be located in a next hop field of the route 1.

In addition, a correspondence between the host device 1 and the VM 1 may be configured in the network device 1 in a pre-configuration manner, that is, a correspondence between the address of the host device 1 and the VM 1 is configured. In this way, the network device 1 may generate the foregoing route 1 based on the pre-configured correspondence between the address of the host device 1 and the VM 1.

Step 302: The network device 1 sends a route 2 to the network device 2, where the route 2 includes a SID 2.

Similarly, the network device 1 may allocate the corresponding SID 2 to the VM 2 or an outbound interface connected to the VM 2, and send the route 2 to the network device 2. A route prefix of the route 2 is the address of the host device, and the route 2 further carries the SID 2.

Step 303: The network device 2 allocates an MPLS label 1 to the route 1, and allocates an MPLS label 2 to the route 2.

After receiving the route 1 and the route 2, the network device 2 may allocate the MPLS label 1 of the route 1 in the MPLS network to the route 1 based on the SID 1, and allocate the MPLS label 2 of the route 2 in the MPLS network to the route 2 based on the SID 2. In addition, the network device 2 may further establish a correspondence 1 between the SID 1 and the MPLS label 1, and a correspondence 2 between the SID 2 and the MPLS label 2.

Moreover, the network device 2 may further establish, based on the address of the network device 1 that is included in the route 1, a correspondence 1 that further includes the network device 1. In other words, the correspondence 1 may be a correspondence among the SID 1, the MPLS label 1, and the address of the network device 1. Similarly, the network device 2 may also establish a correspondence 2 that further includes the network device 1. In other words, the correspondence 2 may be a correspondence among the SID 2, the MPLS label 2, and the address of the network device 1.

It may be understood that a sequence in which the network device 2 allocates the MPLS label 1 and the MPLS label 2 may be determined based on a sequence in which the network device 2 receives the route 1 and the route 2. When the network device 1 first receives the route 1, the network device first allocates the MPLS label 1 corresponding to the route 1. When the network device 1 first receives the route 2, the network device first allocates the MPLS label 2 corresponding to the route 2.

Step 304: The network device 2 sends a route 3 including the MPLS label 1 to the network device 3.

Step 305: The network device 2 sends a route 4 including the MPLS label 2 to the network device 3.

After allocating the corresponding MPLS labels, the network device 2 may generate the corresponding route 3 and route 4 based on the route 1 and the route 2, and send the route 3 including the MPLS label 1 and the route 4 including the MPLS label 2 to the network device 3. Route prefixes of the route 3 and the route 4 are the same as the route prefixes of the route 1 and the route 2, that is, the address of the host device.

After receiving the route 3 and the route 4, the network device 3 may generate a corresponding forwarding entry based on the route 3 and the route 4. A prefix address of the forwarding entry is the address of the host device, and the forwarding entry has the corresponding MPLS label 1 and MPLS label 2.

Step 306: The network device 3 receives a packet 1 sent by a server.

When the server connected to the network device 3 performs service transmission, the network device 3 may receive the packet 1 sent by the server. A destination address of the packet 1 may be the address of the host device.

Step 307: The network device 3 updates the packet 1 to obtain a packet 2 including the MPLS label 2, and sends the packet 2 to the network device 2.

Based on the destination address in the packet 1, the network device 3 may search a routing table for a forwarding entry that matches the destination address in the packet 1, so as to determine the foregoing generated forwarding entry, and determine the corresponding MPLS label 1 and MPLS label 2.

After determining the MPLS label 1 and the MPLS label 2 corresponding to the packet 1, the network device 3 may determine one MPLS label in the two MPLS labels, to forward the packet 1. For example, in this embodiment, the network device 3 may select the MPLS label 2 according to a preset load balancing policy, to forward the packet 1. In this way, the network device 3 encapsulates the MPLS label 2 into the packet 1, to obtain the packet 2 including the MPLS label 2, and sends the packet 2 to the network device 2 based on an MPLS tunnel corresponding to the MPLS label 2.

Step 308: The network device 2 updates the packet 2 to obtain a packet 3 including the SID 2, and sends the packet 3 to the network device 1

After receiving the packet 2, the network device 2 may determine, based on the pre-established correspondence 2 and the MPLS label 2 in the packet 2, the SID 2 corresponding to the MPLS label 2. Then, the network device 2 may decapsulate the packet 2, remove the MPLS label 2 carried in the packet 2, and encapsulate the SID 2 into the packet 2, to obtain the packet 3 including the SID 2.

In a possible implementation, when the correspondence 2 established by the network device 2 further includes the address that is of the network device 1 and that corresponds to the SID 2, the network device 2 may send the packet 3 including the SID 2 to the network device 1 based on the determined address of the network device 1.

In another possible implementation, when the correspondence 2 established by the network device 2 does not include the address of the network device 1, the network device 2 may determine, based on a preset mapping relationship between a SID and an address of a network device, an address that is of a network device and that corresponds to the SID 2 (that is, the address of the network device 1), so as to send the packet 3 to the network device 1. In other words, the network device 1 may allocate a SID to a VM based on a pre-allocated address segment, so as to ensure that both the SID 1 and the SID 2 allocated by the network device 1 are within an allocatable address segment corresponding to the network device 1. In the network device 2, a mapping relationship between the address of the network device 1 and the allocatable address segment corresponding to the network device 1 may be preset. In this way, after the network device 2 obtains the SID 2, the network device 2 may determine that the SID 2 is within the allocatable address segment corresponding to the network device 1, so as to determine the address of the network device 1.

Step 309: The network device 1 sends the packet 3 to the VM 2.

After receiving the packet 3, the network device 1 may determine, based on the SID 2 in the packet 3, the VM 2 corresponding to the SID 2, so as to send the packet 3 to the VM 2.

Based on the embodiment corresponding to FIG. 3, except that the network device 2 may receive routes with a same route prefix that are advertised by a same network device, the network device 2 may alternatively receive routes with a same route prefix that are advertised by different network devices.

Figure 4:
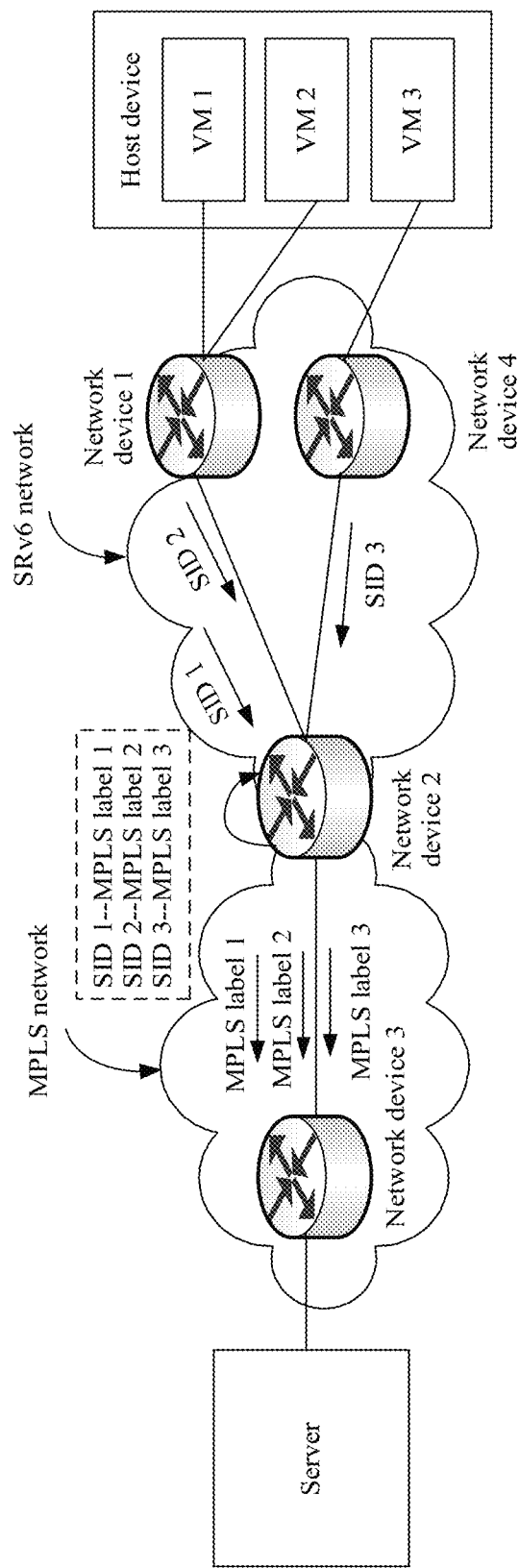
FIG. 4 is a schematic diagram of a route processing method according to an embodiment.

For example, FIG. 4 is a schematic diagram of a route processing method according to an embodiment. As shown in FIG. 4, based on FIG. 3, a VM 3 configured to carry a service may further be added on a host device, and the VM 3 is connected to a network device 4.

A network device 1 respectively allocates a SID 1 and a SID 2 to a VM 1 and a VM 2, and the network device 1 sends routes that respectively carry the SID 1 and the SID 2 to a network device 2. The network device 4 allocates a SID 3 to the VM 3, and sends a route that carries the SID 3 to the network device 2. In addition, route prefixes of the routes sent by the network device 4 and the network device 1 are the same, and all the route prefixes are an address of the host device.

The network device 2 may generate a correspondence between a SID and an MPLS label based on the routes sent by the network device 1 and the network device 4. To be specific, the SID 1 corresponds to an MPLS label 1, the SID 2 corresponds to an MPLS label 2, and the SID 3 corresponds to an MPLS label 3. The network device 2 sends routes that respectively carry the MPLS label 1, the MPLS label 2, and the MPLS label 3 to a network device 3.

After receiving the three routes sent by the network device 2, the network device 3 may generate a corresponding forwarding entry. A prefix address of the forwarding entry is the address of the host device, and the forwarding entry has the corresponding MPLS label 1, MPLS label 2, and MPLS label 3.

Alternatively, the network device 3 may generate three corresponding forwarding entries based on the three routes sent by the network device 2. All of prefix addresses of the three forwarding entries are the address of the host device, and the three forwarding entries respectively have the corresponding MPLS label 1, MPLS label 2, and MPLS label 3.

In this way, when the network device 3 receives a packet destined for the host device, the network device 3 may determine, by searching a routing table, that corresponding MPLS labels are the MPLS label 1, the MPLS label 2, and the MPLS label 3. The network device 3 may select one MPLS label from the three MPLS labels according to a preset load balancing policy, to transmit the packet. In this case, when the network device 2 receives the packet sent by the network device 3, the network device 2 may determine a corresponding SID based on the generated correspondence between a SID and an MPLS label, and send the packet.

To be specific, when the network device 3 selects an MPLS label according to the load balancing policy, a ratio of selecting the MPLS label 1, the MPLS label 2, and the MPLS label 3 may be 1:1:1. Because transmission paths corresponding to the MPLS label 1, the MPLS label 2, and the MPLS label 3 are paths to the VM 1, the VM 2, and the VM 3, a ratio of packets received by the VM 1 to packets received by the VM 2 to packets received by the VM 3 is 1:1:1, so that load balancing between VMs is implemented, and normal packet processing can be ensured.

In a possible embodiment, in the embodiment corresponding to FIG. 2, the second network device may be connected to a service instance in a single-homing access manner, or the second network device may be connected to a service instance in a dual-homing access manner. In other words, in addition to the second network device, another network device (for example, a fourth network device) may be connected to a same VPN instance or VM as the second network device. When the second network device is connected in the dual-homing access manner, identifiers allocated by the second network device and the fourth network device to the VPN instance or VM may be the same.

For example, the route processing method 200 may further include: The first network device receives a fifth route sent by the fourth network device, where the fifth route includes an address of the fourth network device and the first identifier, a prefix address of the fifth route is the same as a prefix address of the first route, the fourth network device is located in the first network domain, and the fourth network device and the second network device are connected to, for example, a same VM or VPN instance.

The first network device allocates a corresponding fifth identifier to the fifth route based on the address of the fourth network device and the first identifier. The address of the fourth network device may be, for example, carried in a next hop field of the fifth route. The first network device sends a sixth route to the third network device based on the fifth route, where the sixth route includes the fifth identifier, and the fifth identifier is used to instruct the third network device to forward a second packet to the first network device.

For example, both the second network device and the fourth network device are located in an SRv6 network, and the third network device is located in an MPLS network. The first identifier carried in the first route sent by the second network device is a SID, and the fifth route sent by the fourth network device also carries the SID. The first network device allocates an MPLS label 1 to the first route based on the address of the second network device and the SID, and sends the MPLS label 1 to the third network device through the second route. The first network device allocates an MPLS label 2 to the fifth route based on the address of the fourth network device and the SID, and sends the MPLS label 2 to the third network device through the sixth route.

Figure 5:
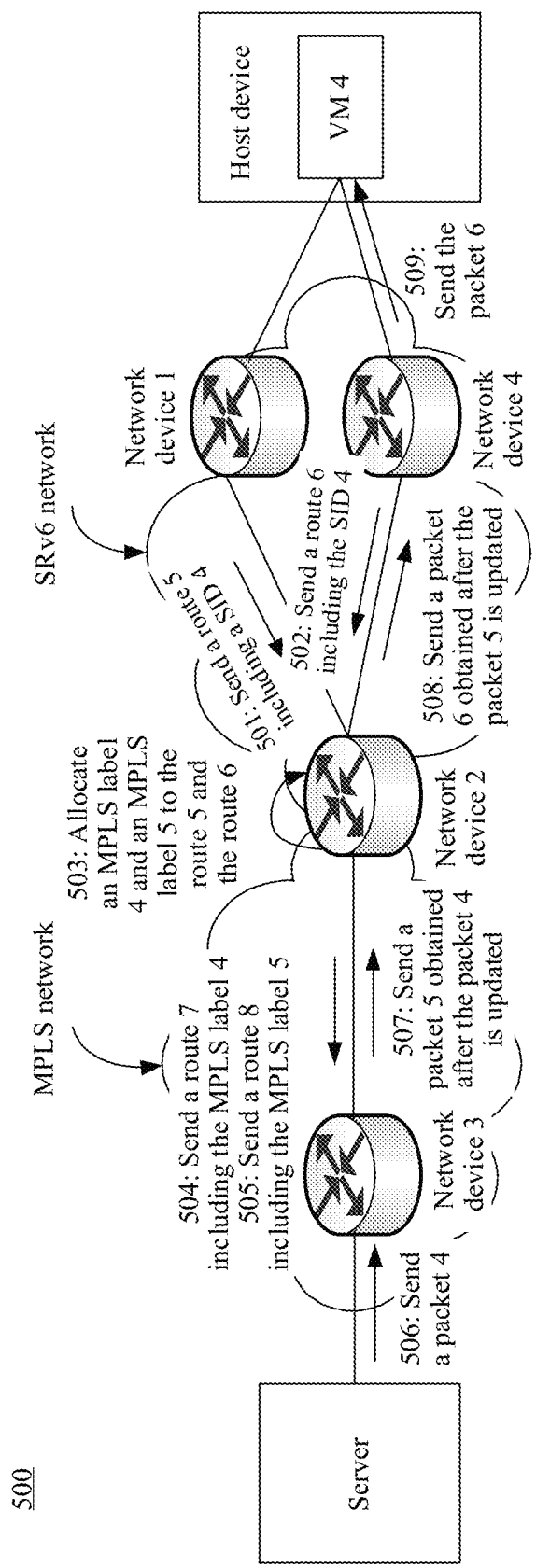
FIG. 5 is a schematic diagram of a route processing method 500 according to an embodiment.

For ease of understanding, the route processing method provided in the embodiments is described below in detail with reference to a specific example. FIG. 5 is a schematic diagram of a route processing method 500 according to an embodiment. As shown in FIG. 5, a network device 1 and a network device 4 are located in an SRv6 network, a network device 3 is located in an MPLS network, and a network device 2 is located in a stitching area between the SRv6 network and the MPLS network. In addition, both the network device 1 and the network device 4 are connected to a VM 4 in a host device. The route processing method 500 includes the following steps.

Step 501: The network device 1 sends a route 5 including a SID 4 to the network device 2.

In this embodiment, the network device 1 may allocate the corresponding SID 4 to the VM 4 connected to the network device 1. After allocating the SID 4, the network device 1 sends the route 5 to the network device 2. A route prefix of the route 5 is an address of the host device, and the route 5 further carries the SID 4.

Step 502: The network device 4 sends a route 6 including the SID 4 to the network device 2.

Similarly, the network device 4 may allocate the corresponding SID 4 to the VM 4, and send the route 6 to the network device 2. A route prefix of the route 6 is the address of the host device, and the route 6 further carries the SID 4.

Step 503: The network device 2 allocates an MPLS label 4 and an MPLS label 5 to the route 5 and the route 6.

Route prefixes of the route 5 and the route 6 received by the network device 2 are the same, and both the route 5 and the route 6 carry the SID 4. In this case, the network device 2 may allocate a corresponding MPLS label to a route based on an address of a network device that sends the route and a SID.

In other words, the network device 2 may allocate the MPLS label 4 to the route 5 based on an address of the network device 1 and the SID 4. The network device 2 may further establish a correspondence 3 among the address of the network device 1, the SID 4, and the MPLS label 4.

Similarly, the network device 2 may allocate the MPLS label 5 to the route 6 based on an address of the network device 4 and the SID 4. The network device 2 may further establish a correspondence 4 among the address of the network device 4, the SID 4, and the MPLS label 5.

Step 504: The network device 2 sends a route 7 including the MPLS label 4 to the network device 3.

Step 505: The network device 2 sends a route 8 including the MPLS label 5 to the network device 3.

Step 504 and step 505 are similar to step 304 and step 305. For details, refer to step 304 and step 305. Details are not described herein again.

Step 506: The network device 3 receives a packet 4 sent by a server.

When the server connected to the network device 3 performs service transmission, the network device 3 may receive the packet 4 sent by the server. A destination address of the packet 4 may be the address of the host device.

Step 507: The network device 3 updates the packet 4 to obtain a packet 5, and sends the packet 5 to the network device 2.

Based on a destination address in the packet 4, the network device 3 may search a routing table for a forwarding entry that matches the destination address in the packet 4, so as to determine the foregoing generated forwarding entry, and determine the corresponding MPLS label 4 and MPLS label 5.

After determining the MPLS label 4 and the MPLS label 5 corresponding to the packet 4, the network device 3 may determine one MPLS label in the two MPLS labels, to forward the packet 4. For example, in this embodiment, the network device 3 may select the MPLS label 5 according to a preset load balancing policy, to forward the packet 4. In this way, the network device 3 encapsulates the MPLS label 5 into the packet 4, to obtain the packet 5 including the MPLS label 5, and sends the packet 5 to the network device 2 based on an MPLS tunnel corresponding to the MPLS label 5.

Step 508: The network device 2 updates the packet 5 to obtain a packet 6, and sends the packet 6 to the network device 4.

After receiving the packet 5 sent by the network device 3, the network device 2 may obtain the MPLS label 5 carried in the packet 5. Based on the foregoing correspondence, the network device 2 may determine the address of the network device 4 and the SID 4 that correspond to the MPLS label 5. Therefore, the network device 2 may decapsulate the packet 5, remove the MPLS label 5 carried in the packet 5, and encapsulate the SID 4 into the packet 5, to obtain the packet 6 including the SID 4. Then, the network device 2 sends the packet 6 to the network device 4 based on the determined address of the network device 4.

Step 509: The network device 4 sends the packet 6 to the VM 4.

After obtaining the packet 6, the network device 4 may determine the corresponding VM 4 based on the SID 4 in the packet 6, and send the packet 6 to the VM 4.

Figure 6:
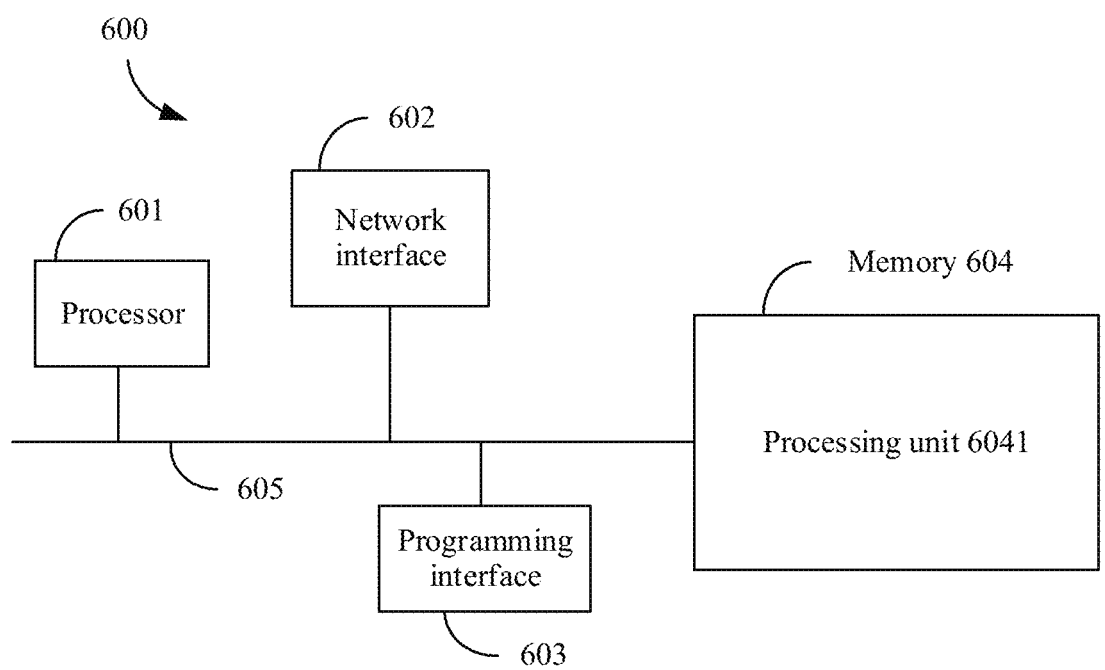
FIG. 6 is a schematic diagram of a structure of a network device 600 according to an embodiment.

To implement the foregoing embodiments, this disclosure further provides a network device. FIG. 6 is a schematic diagram of a structure of a network device 600 according to an embodiment.

Although the network device 600 shown in FIG. 6 shows some specific features, a person skilled in the art may be aware from the embodiments that, for brevity, FIG. 6 does not show various other features, to avoid confusing more related aspects of the implementations disclosed in the embodiments. For this purpose, for example, in some implementations, the network device 600 includes one or more processors 601, a network interface 602, a programming interface 603, a memory 604, and one or more communications buses 605 that are configured to interconnect various components. In some other implementations, some functional components or units may be omitted or added to the network device 600 based on the foregoing example.

In some implementations, in addition to another purpose, the network interface 602 is configured to connect to one or more other network devices/servers in a network system. In some implementations, the communications bus 605 includes a circuit that interconnects system components and controls communication between the system components. The memory 604 may include a non-volatile memory, for example, a read-only memory (ROM), a programmable ROM (PROM), an erasable PROM (EPROM), an electrically erasable PROM (EEPROM), or a flash memory. The memory 604 may also include a volatile memory. The volatile memory may be a random-access memory (RAM), and is used as an external cache.

In some implementations, a non-transitory computer-readable storage medium of the memory 604 or the memory 604 stores the following programs, modules, and data structures, or a subset thereof, and for example, includes a transceiver unit (not shown in the figure) and a processing unit 6041.

In a possible embodiment, the network device 600 may have any function of the first network device in the method 200 or the first network device in the method 300 or method 500. The transceiver unit in the network device 600 is configured to perform step 201, step 207, step 304, step 305, step 308, step 504, step 505, or step 508. The processing unit 6041 is configured to perform step 202, step 203, step 206, step 303, or step 503.

It should be understood that the network device 600 corresponds to the first network device in the foregoing method embodiments, and the modules and the foregoing other operations and/or functions in the network device 600 are separately used to implement various steps and methods implemented by the first network device in the foregoing method embodiments. For specific details, refer to the method 200, the method 300, or the method 500. For brevity, details are not described herein again.

It should be understood that the foregoing function of the transceiver unit may be implemented by the processor by invoking program code in the memory, and cooperation with the network interface 602 is performed when necessary. Alternatively, a data receiving/sending operation may be completed by the network interface 602 on the network device 600.

In various implementations, the network device 600 is configured to perform the route processing method provided in the embodiments, for example, perform the route processing method corresponding to the embodiment shown in FIG. 2, FIG. 3, or FIG. 5.

Corresponding to the method embodiment and the virtual apparatus embodiment provided, an embodiment further provides a network device. The following describes a hardware structure of the network device.

Figure 7:
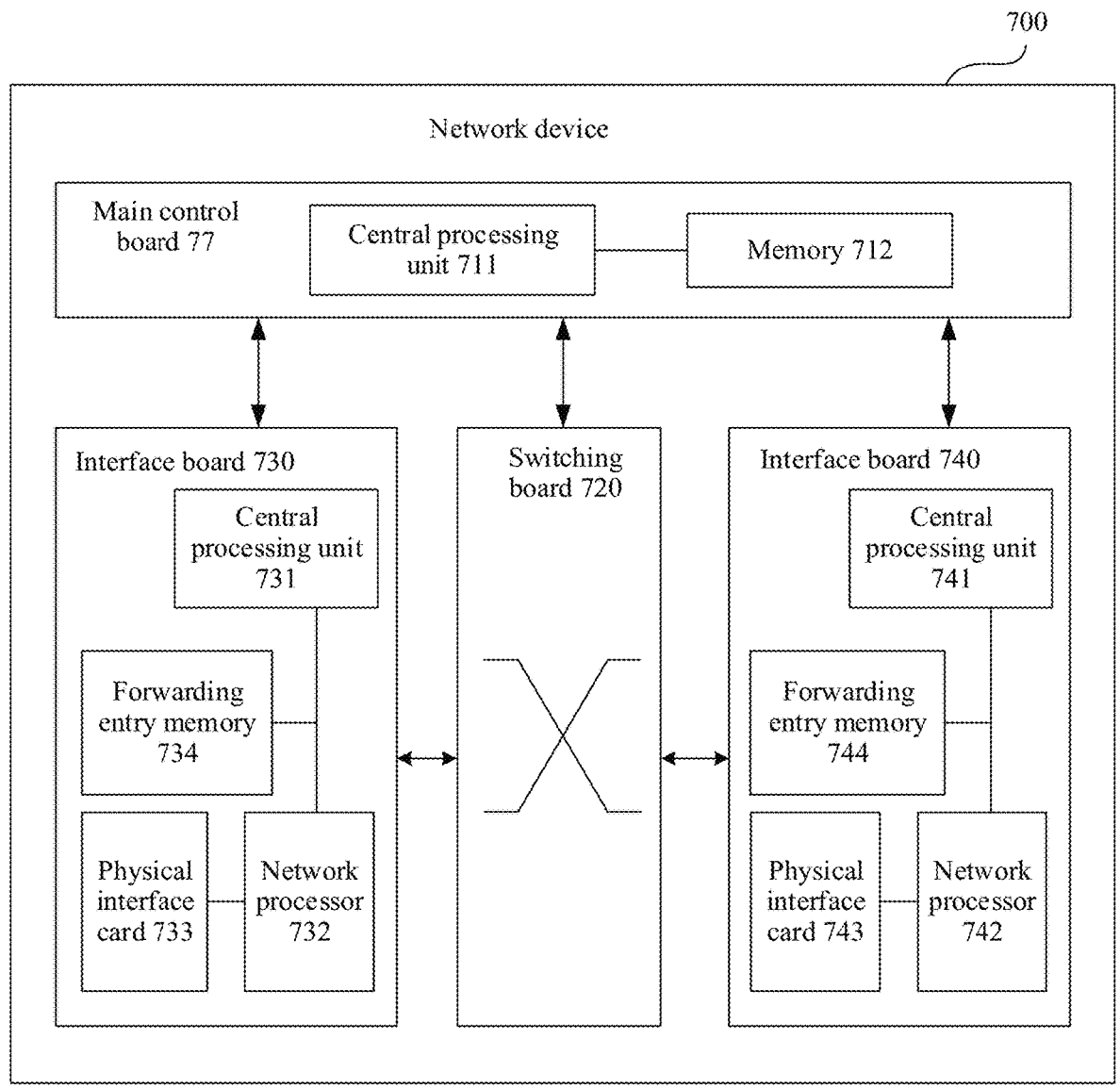
FIG. 7 is a schematic diagram of a structure of a network device 700 according to an embodiment.

FIG. 7 is a schematic diagram of a structure of a network device 700 according to an embodiment. The network device 700 may be configured as the first network device in the foregoing method embodiments.

The network device 700 may correspond to the first network device in the foregoing method embodiments. Hardware, modules, and the foregoing other operations and/or functions in the network device 700 are separately used to implement various steps and methods implemented by the first network device in the method embodiments. For specific details of a detailed procedure about how the network device 700 forwards a packet, refer to the foregoing method embodiments. For brevity, details are not described herein again. The steps of the method 200, the method 300, or the method 500 are completed by using an integrated logic circuit of hardware in a processor of the network device 700 or instructions in a form of software. The steps of the methods disclosed with reference to the embodiments may be directly performed and completed by a hardware processor, or may be performed and completed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the steps in the foregoing methods in combination with the hardware of the processor. To avoid repetition, details are not described herein.

The network device 700 includes a main control board 77 and an interface board 730.

The main control board 77 is also referred to as a main processing unit (MPU) or a route processor card. The main control board 77 controls and manages components in the network device 700, including route computation, device management, device maintenance, and protocol processing functions. The main control board 77 includes a central processing unit 711 and a memory 712.

The interface board 730 is also referred to as a line processing unit (LPU), a line card, or a service board. The interface board 730 is configured to provide various service interfaces, and forward a data packet. The service interfaces include but are not limited to an Ethernet interface, a Packet over Synchronous Optical Networking/Synchronous Digital Hierarchy (POS) interface, and the like. The Ethernet interface is, for example, a Flexible Ethernet (FlexE) service interface. The interface board 730 includes a central processing unit 731, a network processor 732, a forwarding entry memory 734, and a physical interface card (PIC) 733.

The central processing unit 731 on the interface board 730 is configured to control and manage the interface board 730 and communicate with the central processing unit 711 on the main control board 77.

The network processor 732 is configured to implement packet forwarding processing. A form of the network processor 732 may be a forwarding chip. Specifically, processing of an uplink packet includes processing of an inbound interface of the packet and forwarding table searching, and processing of a downlink packet includes forwarding table searching and the like.

The physical interface card 733 is configured to implement an interconnection function at a physical layer. Original traffic enters the interface board 730 from the physical interface card 733, and a processed packet is sent from the physical interface card 733. The physical interface card 733 includes at least one physical interface. The physical interface is also referred to as a physical port. The physical interface card 733 corresponds to a FlexE physical interface in a system architecture. The physical interface card 733, also referred to as a sub-card, may be installed on the interface board 730, and is responsible for converting an optical/electrical signal into a packet, performing validity check on the packet, and forwarding the packet to the network processor 732 for processing. In some embodiments, the central processing unit 731 on the interface board 730 may also perform a function of the network processor 732, for example, implement software forwarding based on a general-purpose CPU. In this case, the network processor 732 is not required in the physical interface card 733.

Optionally, the network device 700 includes a plurality of interface boards. For example, the network device 700 further includes an interface board 740. The interface board 740 includes a central processing unit 741, a network processor 742, a forwarding entry memory 744, and a physical interface card 743.

Optionally, the network device 700 further includes a switching board 720. The switching board 720 may also be referred to as a switch fabric unit (SFU). When the network device has the plurality of interface boards, the switching board 720 is configured to complete data exchange between the interface boards. For example, the interface board 730 and the interface board 740 may communicate with each other by using the switching board 720.

The main control board 77 and the interface board 730 are coupled. For example, the main control board 77, the interface board 730 and the interface board 740, and the switching board 720 are connected to a system backplane through a system bus to implement interworking. In a possible implementation, an inter-process communication (IPC) channel is established between the main control board 77 and the interface board 730, and the main control board 77 and the interface board 730 communicate with each other through the IPC channel.

Logically, the network device 700 includes a control plane and a forwarding plane. The control plane includes the main control board 77 and the central processing unit 731. The forwarding plane includes components used for forwarding, for example, the forwarding entry memory 734, the physical interface card 733, and the network processor 732. The control plane performs functions such as a function of a router, generating a forwarding table, processing signaling and protocol packets, and configuring and maintaining a status of a device. The control plane delivers the generated forwarding table to the forwarding plane. On the forwarding plane, the network processor 732 searches the forwarding table delivered by the control plane to forward a packet received by the physical interface card 733. The forwarding table delivered by the control plane may be stored in the forwarding entry memory 734. In some embodiments, the control plane and the forwarding plane may be completely separated, and are not on a same device.

It should be understood that an operation performed on the interface board 740 is consistent with an operation performed on the interface board 730 in this embodiment. For brevity, details are not described. It should be understood that the network device 700 in this embodiment may correspond to the first network device or the second network device in the foregoing method embodiments. The main control board 77, and the interface board 730 and/or the interface board 740 in the network device 700 may implement the functions and/or the steps implemented by the first network device in the foregoing method embodiments. For brevity, details are not described herein.

It should be noted that, there may be one or more main control boards. When there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, load sharing and redundancy backup may be implemented by the switching boards together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a relatively weak data exchange and processing capability. Which architecture is specifically used depends on a specific networking deployment scenario, and is not uniquely limited herein.

In some possible embodiments, the first network device may be implemented as a virtualized device. For example, the virtualized device may be a VM on which a program having a packet sending function runs, and the VM is deployed on a hardware device (for example, a physical server). The VM is a complete computer system that is simulated by software, that has a complete hardware system function, and that runs in a completely isolated environment. The VM may be configured as the first network device or the second network device. For example, the first network device or the second network device may be implemented based on a general-purpose physical server in combination with a network functions virtualization (NFV) technology. The first network device or the second network device is a virtual host, a virtual router, or a virtual switch. After reading this disclosure, with reference to the NFV technology, a person skilled in the art may virtualize, on the general-purpose physical server, the first network device or the second network device having the foregoing functions. Details are not described herein.

It should be understood that the network devices in the foregoing product forms separately have any function of the first network device in the foregoing method embodiments, and details are not described herein.

An embodiment provides a computer program product. When the computer program product runs on a network device, the network device is enabled to perform the method performed by the first network device in the method 200, the method 300, or the method 500.

Figure 8:
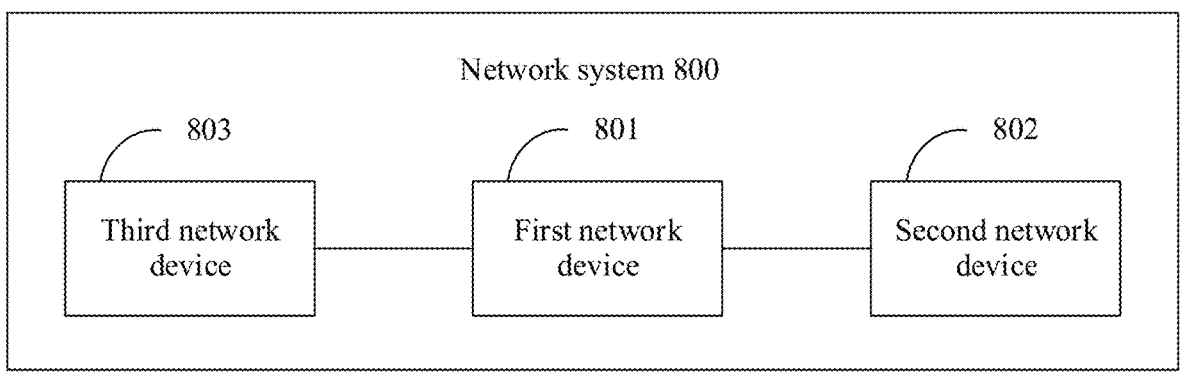
FIG. 8 is a schematic diagram of a structure of a network system 800 according to an embodiment.

Referring to FIG. 8, an embodiment provides a network system 800. The system 800 includes a first network device 801, a second network device 802, and a third network device 803. Optionally, the first network device 801 may be the first network device in the method 200, the network device 600, or the network device 700. The second network device 802 may be the second network device in the method 200. The third network device 803 may be the third network device in the method 200.

An embodiment further provides a chip, including a processor and an interface circuit. The interface circuit is configured to receive an instruction and transmit the instruction to the processor. The processor is coupled to a memory, the memory is configured to store programs or instructions, and when the programs or the instructions are executed by the processor, the chip system is enabled to implement the method in any one of the foregoing method embodiments.

Optionally, there may be one or more processors in the chip system. The processor may be implemented by using hardware, or may be implemented by using hardware. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may be one or more memories in the chip system. The memory may be integrated with the processor, or may be disposed separately from the processor. This is not limited in this disclosure. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this disclosure.

For example, the chip system may be a field-programmable gate array (FPGA), an application-specific integrated chip (ASIC), a system-on-chip (SoC), a central processing unit (CPU), a network processor (NP), a digital signal processor (DSP), a micro controller unit (MCU), a programmable logic device (PLD), or another integrated chip.

The foregoing describes the embodiments in detail. Steps in the methods in the embodiments may be sequentially scheduled, combined, or deleted based on an actual requirement. Modules in the apparatus in the embodiments may be divided, combined, or deleted based on an actual requirement.

It should be understood that "one embodiment" or "an embodiment" mentioned in the entire specification means that particular features, structures, or characteristics related to the embodiment are included in at least one embodiment. Therefore, "in one embodiment" or "in an embodiment" appearing throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments. The execution sequences of the processes should be determined based on functions and internal logic of the processes, and should not be construed as any limitation on the implementation processes of the embodiments.

The term "and/or" in this specification describes only an association relationship for describing associated objects and represents that three relationships may exist. For example, A and/or B may represent the following three cases: only A exists, both A and B exist, and only B exists. In addition, the character "/" in this specification usually indicates an "or" relationship between the associated objects.

It should be understood that in the embodiments, "B corresponding to A" indicates that B is associated with A, and B may be determined according to A. However, it should further be understood that determining B according to A does not mean that B is determined according to A only. B may be alternatively determined according to A and/or other information.

A person of ordinary skill in the art may be aware that, in combination with the embodiments disclosed in this specification, units and algorithm steps in the examples can be implemented by electronic hardware, computer software, or a combination thereof. To clearly describe the interchangeability between hardware and software, the foregoing has generally described compositions and steps of each example based on functions. Whether the functions are performed by hardware or software depends on a particular application and a design constraint condition of a technical solution. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided, it should be understood that the disclosed system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on an actual requirement to achieve the objectives of the solutions of the embodiments.

In addition, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions essentially, or the part contributing to the conventional technology, or all or some of the technical solutions may be implemented in a form of a software product. The computer software product is stored in a storage medium and includes several instructions for instructing a computer device (which may be a personal computer, a server, a network device/server, or the like) to perform all or some of the steps of the methods in the embodiments. The foregoing storage medium includes: any medium that can store program code, such as a USB flash drive, a removable hard disk, a read-only memory, a random access memory, a magnetic disk, or an optical disc.

What is claimed is:

1. A route processing method implemented by a first network device and comprising:
receiving, from a second network device in a first network domain, a first route comprising a first identifier, wherein the first identifier instructs the first network device to forward a first packet to the second network device, wherein the first identifier identifies a service source corresponding to the first route, and wherein the service source comprises an outbound interface on the second network device or a virtual machine connected to the second network device;
allocating, based on the first identifier, a second identifier corresponding to the first route; and
sending, to a third network device in a second network domain and based on the first route, a second route comprising the second identifier,
wherein the second identifier instructs the third network device to forward the first packet to the first network device.

2. The route processing method of claim 1, wherein the first route further comprises an address of the second network device, and wherein the route processing method further comprises further allocating, based on the address, the second identifier.

3. The route processing method of claim 1, wherein the service source further comprises a virtual private network (VPN) instance connected to the second network device.

4. The route processing method of claim 1, further comprising:
receiving, from the second network device, a third route comprising an address of the second network device and a third identifier, wherein the third identifier and the first identifier identify different service sources;
allocating, based on the address and the third identifier, a fourth identifier corresponding to the third route; and
sending, to the third network device based on the third route, a fourth route comprising the fourth identifier,
wherein the fourth identifier instructs the third network device to forward a third packet to the first network device.

5. The route processing method of claim 1, further comprising:
receiving, from a fourth network device in the first network domain, a fifth route comprising an address of the fourth network device and the first identifier, wherein the first route and the fifth route have the same prefix address;
allocating, to the fifth route based on the address and the first identifier, a fifth identifier; and
sending, to the third network device based on the fifth route, a sixth route comprising the fifth identifier,
wherein the fifth identifier instructs the third network device to forward a second packet to the first network device.

6. The route processing method of claim 1, further comprising:
establishing a correspondence between the first identifier and the second identifier;
receiving, from the third network device, the first packet, wherein the first packet comprises the second identifier;
updating the first packet based on the second identifier and the correspondence to obtain a second packet comprising the first identifier; and
sending, to the second network device, the second packet.

7. The route processing method of claim 6, wherein the correspondence is among an address of the second network device, the first identifier, and the second identifier, and wherein the route processing method further comprises:
determining the address of the second network device based on the first identifier and the correspondence; and
further sending, to the second network device based on the address, the second packet.

8. The route processing method of claim 1, wherein the first network domain uses a multi-protocol label switching (MPLS) tunnel and the second network domain uses a Segment Routing over Internet Protocol version 6 (SRv6) tunnel, or wherein the first network domain uses the SRv6 tunnel and the second network domain uses the MPLS tunnel.

9. The route processing method of claim 1, wherein the first identifier is a segment identifier (SID) and the second identifier is a multiprotocol label switching (MPLS) label, or wherein the first identifier is an MPLS label and the second identifier is an SID.

10. The route processing method of claim 1, wherein the first network device comprises a gateway device of a data center or an aggregation device of an Internet Protocol (IP) radio access network (RAN).

11. The route processing method of claim 1, wherein the second network device comprises a provider edge (PE) device.

12. A first network device comprising:
a memory configured to store instructions; and
one or more processors coupled to the memory and configured to execute the instructions to:
  receive, from a second network device in a first network domain, a first route comprising a first identifier, wherein the first identifier instructs the first network device to forward a first packet to the second network device, wherein the first identifier identifies a service source corresponding to the first route, and wherein the service source comprises an outbound interface on the second network device or a virtual machine connected to the second network device;
  allocate, based on the first identifier, a second identifier corresponding to the first route; and
  send, to a third network device in a second network domain and based on the first route, a second route comprising the second identifier,
  wherein the second identifier instructs the third network device to forward the first packet to the first network device.

13. The first network device of claim 12, wherein the first route further comprises an address of the second network device, and wherein the one or more processors are further configured to execute the instructions to further allocate, based on the address, the second identifier.

14. The first network device of claim 12, wherein the service source further comprises a virtual private network (VPN) instance connected to the second network device.

15. The first network device of claim 12, wherein the one or more processors are further configured to execute the instructions to:
  receive, from the second network device, a third route comprising an address of the second network device and a third identifier, wherein the third identifier and the first identifier identify different service sources;
  allocate, based on the address and the third identifier, a fourth identifier corresponding to the third route; and
  send, to the third network device based on the third route, a fourth route comprising the fourth identifier,
  wherein the fourth identifier instructs the third network device to forward a third packet to the first network device.

16. The first network device of claim 12, wherein the one or more processors are further configured to execute the instructions to:
  receive, from a fourth network device in the first network domain, a fifth route comprising an address of the fourth network device and the first identifier, wherein the first route and the fifth route have the same prefix address;
  allocate, to the fifth route based on the address and the first identifier, a fifth identifier; and
  send, to the third network device based on the fifth route, a sixth route comprising the fifth identifier,
  wherein the fifth identifier instructs the third network device to forward a second packet to the first network device.

17. The first network device of claim 12, wherein the one or more processors are further configured to execute the instructions to:
  establish a correspondence between the first identifier and the second identifier;
  receive, from the third network device, the first packet, wherein the first packet comprises the second identifier;
  update the first packet based on the second identifier and the correspondence to obtain a second packet comprising the first identifier; and
  send, to the second network device, the second packet.

18. A network system comprising:
a second network device in a first network domain using a first packet forwarding type, wherein the second network device is configured to send a first route comprising a first identifier, wherein the first identifier instructs forwarding a first packet to the second network device, wherein the first identifier identifies a service source corresponding to the first route, and wherein the service source comprises an outbound interface on the second network device or a virtual machine connected to the second network device;
a first network device configured to:
  receive, from the second network device, the first route;
  allocate, based on the first identifier, a second identifier corresponding to the first route; and
  send, based on the first route, a second route comprising the second identifier, wherein the second identifier instructs forwarding the first packet to the first network device; and
a third network device in a second network domain using a second packet forwarding type, wherein the third network device is configured to receive, from the first network device, the second route.

19. The first network device of claim 17, wherein the correspondence is among an address of the second network device, the first identifier, and the second identifier, and wherein the one or more processors are further configured to execute the instructions to:
  determine the address of the second network device based on the first identifier and the correspondence; and
  further send, to the second network device based on the address, the second packet.

20. The first network device of claim 12, wherein the first network domain uses a multi-protocol label switching (MPLS) tunnel and the second network domain uses a Segment Routing over Internet Protocol version 6 (SRv6) tunnel, or wherein the first network domain uses the SRv6 tunnel and the second network domain uses the MPLS tunnel.

* * * * *